US006802475B2

(12) United States Patent
Davies et al.

(10) Patent No.: US 6,802,475 B2
(45) Date of Patent: Oct. 12, 2004

(54) FLIGHT SURFACE ACTUATOR

(75) Inventors: Jonathan Paul Davies, Western Downs (GB); Brian Farley, Hartpury (GB)

(73) Assignee: Smiths Wolverhampton Limited, Wolverhampton (GB)

( * ) Notice: Subject to any disclaimer, the term of this patent is extended or adjusted under 35 U.S.C. 154(b) by 0 days.

(21) Appl. No.: 10/439,527

(22) Filed: May 16, 2003

(65) Prior Publication Data

US 2004/0004163 A1 Jan. 8, 2004

(30) Foreign Application Priority Data

Jul. 4, 2002 (GB) ............................................. 0215522
Mar. 5, 2003 (GB) ............................................. 0305012

(51) Int. Cl.[7] ............................................. B64C 13/32
(52) U.S. Cl. .................................... 244/75 R; 244/220
(58) Field of Search .............................. 244/75 R, 220, 244/87, 90 R, 46

(56) References Cited

U.S. PATENT DOCUMENTS 4,362,067 A * 12/1982 Earl et al. ................ 74/479.01
4,533,096 A * 8/1985 Baker et al. .............. 244/75 R
4,834,326 A 5/1989 Stache
6,152,692 A * 11/2000 Aubry ......................... 416/24
6,499,690 B1 * 12/2002 Katayama et al. ....... 244/17.11
6,644,599 B2 * 11/2003 Perez ......................... 244/219
2001/0042811 A1 * 11/2001 Rodrigues ................... 244/234

FOREIGN PATENT DOCUMENTS

FR 1392727 2/1965
GB 2043561 10/1980
GB 2138756 10/1984

* cited by examiner

*Primary Examiner*—Michael J. Carone
*Assistant Examiner*—Gabriel S. Sukman
(74) *Attorney, Agent, or Firm*—Reising, Ethington, Barnes, Kisselle, P.C.

(57) ABSTRACT

An aircraft flight surface actuator has at least one eccentric cam mechanism, the eccentric cam mechanism imparting movement onto the flight surface.

13 Claims, 6 Drawing Sheets

FLIGHT SURFACE ACTUATOR

BACKGROUND TO THE INVENTION

The present invention relates to an aircraft flight surface actuator and a flight surface actuator system including such an actuator.

Modern aircraft have flight surfaces, such as the wings and tail section, that includes sections that are movable with respect to the rest of the flight surface. An example of this are the flaps in the trailing or leading edge of an aircraft wing. During takeoff and landing the flaps are deployed to increase the lift generated by the wing, the deployed flaps altering the overall shape of the wing and thus changing the lift generated by it.

Generally, the available space within an aircraft wing for housing the actuators used to move the flaps is not large as the leading and trailing edges of the wing tend to the thinnest points of the wing. Furthermore, the space within the wing is also used to house other mechanical systems, as well as for fuel storage.

Additionally mechanical forces exerted on the flaps, and thus the actuators, can be large and it is desirable to distribute these forces as evenly and widely across the flaps and structural elements of the wing as possible. It is therefore sometimes desirable to use a large number of actuators, so that no single actuator or associated wing section must withstand a particularly high load.

For the reason stated above it is therefore beneficial to have compact flight surface actuators.

SUMMARY OF THE INVENTION

According to a first aspect of the invention there is provided an aircraft flight surface actuator comprising at least one eccentric cam mechanism having an eccentric cam co-operating with a lever assembly, the lever assembly being coupled to a flight surface, whereby rotation of the eccentric cam imparts movement of the flight surface.

Preferably, the actuator further comprises a drive mechanism arranged to rotationally drive the or each eccentric cam mechanism. The drive mechanism may include a gear box of any suitable kind, being arranged to receive rotary drive from a power drive unit and to perform the appropriate speed reduction or multiplication to be imparted to the eccentric cam mechanism as appropriate.

Preferably, rotational drive from the gear arrangement is transmitted to the eccentric cam mechanism by means of a torque tube.

A number of eccentric cam mechanisms may receive rotational drive from a single gear arrangement, with each of the individual eccentric cam mechanisms being rotationally coupled to a neighboring cam mechanism by means of a torque tube, such a rotational drive from the gear arrangement is transmitted to each of the eccentric cam mechanisms.

Preferably, the lever assembly comprises a link element in engagement with the eccentric cam and a lever arm pivotally connected to the link element. Preferably, at least one of the pivotal connection between the lever arm and link element and the engagement means between the link element and eccentric cam comprise either a rolling element bearing, a plain bearing, a spherical plain bearing or a spherical rolling element bearing. The use of one of the listed bearings allows some degree of axial misalignment between the respective parts of the lever assembly. Such axial misalignment is likely to occur due to the loadings being applied to the flight control surfaces. For example, it would be appreciated by those skilled in the art that an aircraft wing is manufactured to accommodate a certain degree of flexing along its length and the use of such bearings accommodate this flexing without degradation of the performance of the bearing.

Preferably, the eccentric cam mechanism is arranged such that during movement of the cam mechanism and lever assembly across the full extent of their permitted travel the eccentric cam undergoes rotation of 180°. Additionally, the actuator is arranged such that at either extent of the maximum permitted movement of the cam mechanism and lever assembly the pivot point between the lever arm and link element and the pivot point about which the eccentric cam rotates coincide with a line of symmetry of the eccentric cam, whereby substantially zero torque can be transmitted from the link element to the eccentric cam. This particular feature of the eccentric cam means that it is not possible for the flight surface to which the actuator is connected to back drive the cam mechanism, as the link element is effectively latched at either extent of its maximum permitted travel.

According to a second aspect of the present invention there is provided a flight surface actuator system comprises a plurality of aircraft flight surface actuators according to the first aspect of the present invention, each aircraft flight surface actuator being rotationally coupled to a power drive unit.

Preferably, the power drive unit is connected to the gear arrangement of each of the plurality of flight surface actuators by means of a power transmission shaft. Additionally, the power transmission shaft is arranged to be concentric with the torque tubes coupled between each eccentric cam mechanism.

BRIEF DESCRIPTION OF THE DRAWINGS

Embodiments of the present invention will be described below, by way of example only, with reference to the accompanying drawings, of which.

DESCRIPTION OF AN EMBODIMENT OF THE INVENTION

Figure 1:
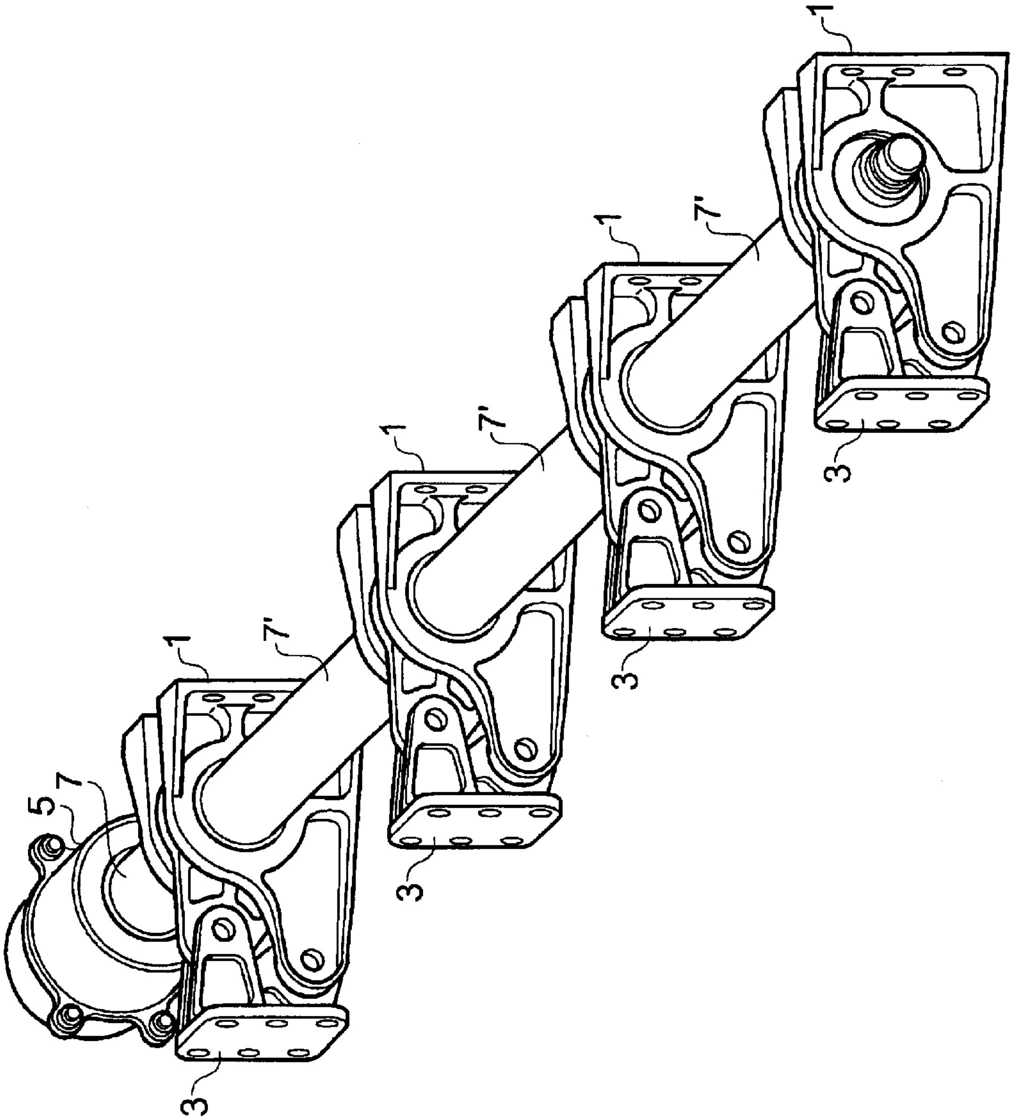
FIG. 1 is a perspective view of a flight surface actuator according to an embodiment of the present invention.

FIG. 1 is a schematic illustration in perspective view of a flight surface actuator according to an embodiment of the present invention. The actuator comprises four eccentric cam mechanisms 1 that in use are mounted a structural element, such as the front spar of an aircraft wing (not shown). Pivotally connected to the eccentric cam mechanisms 1 are lower arms 3 which are in turn connected to the aircraft flight surface being controlled, for example a wig flap. A gear box 5, or other suitable gearing arrangement, is connected via a torque tube 7 to the nearest one of the eccentric cam mechanisms 1. The gear box 5 is arranged to receive an input shaft (not shown) from a power drive unit and to transmit the rotational drive to the torque tube 7, after either increasing or decreasing the rotational speed. Each adjacent eccentric cam mechanism 1 is coupled to one another via subsequent torque tubes 7'. Hence rotational drive from the gearbox 5 is transmitted to each of the eccentric cam mechanisms 1 that together form a single actuator.

Figure 2:
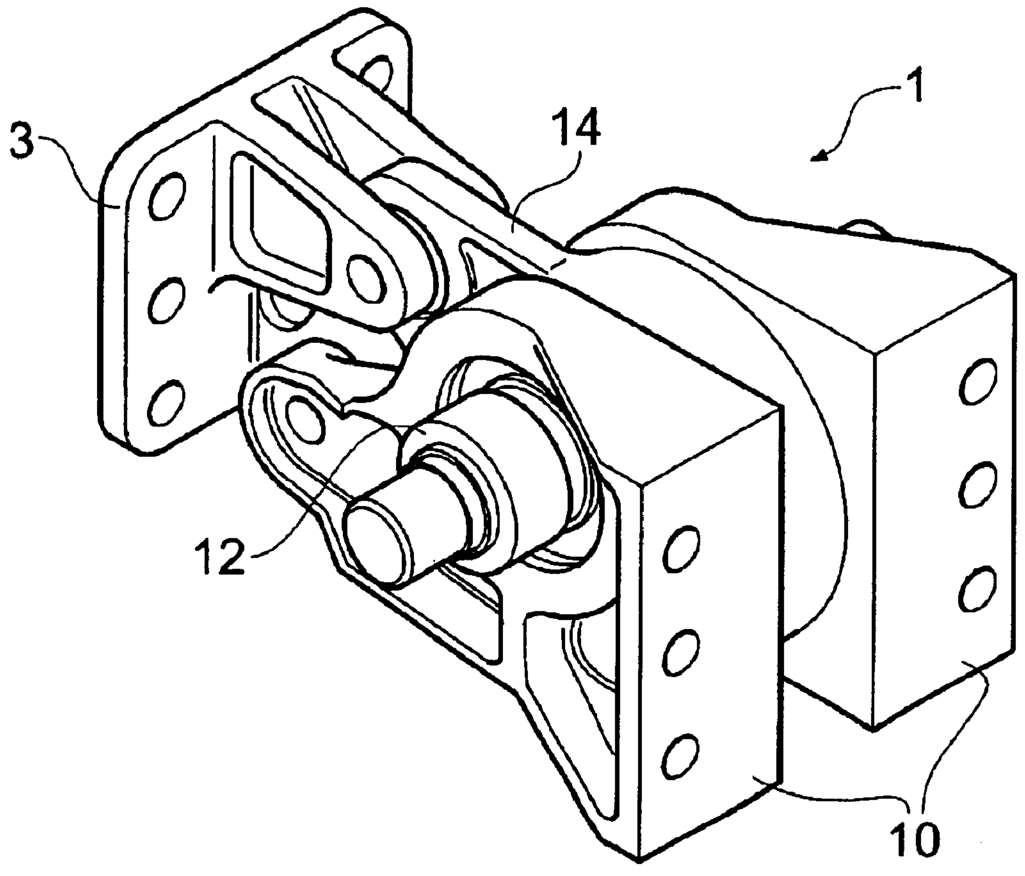
FIG. 2 is a perspective view of an eccentric cam mechanism and lever assembly as seen in FIG. 1.

A perspective view of one of the eccentric cam mechanisms 1 and lever arm 3 shown in FIG. 1 is illustrated in FIG. 2. The eccentric cam mechanism 1 consists of a bracket 10 that in use is mounted to the front spar of an aircraft wing. The bracket 10 supports the actual eccentric cam (not visible in FIG. 2) in a pair of bearings 12. The eccentric cam itself in turn has a bearing around its periphery that guides and supports a link element 14. The lever arm 3 is pivotally connected using further bearings to both the bracket 10 and link element 14. The lever arm 3 forms the attachment and hinge for the flight control surface.

Figure 3F:
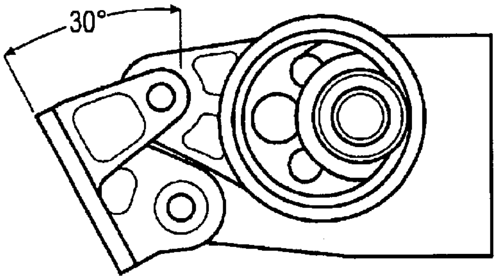
FIG. 3*a* to 3*f* are schematic illustrations of the eccentric cam and lever assembly shown in FIG. 2 at various degrees of rotation.
Figure 3E:
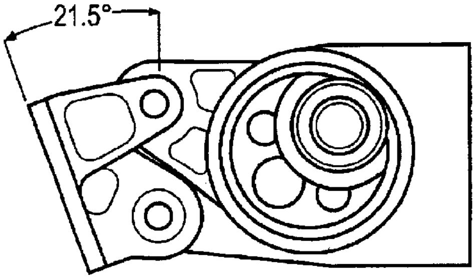
Figure 3D:
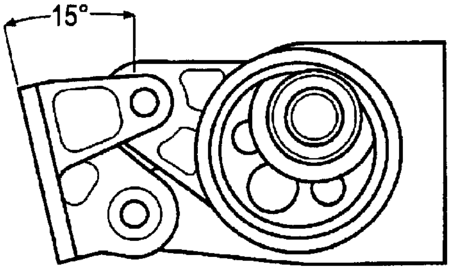
Figure 3C:
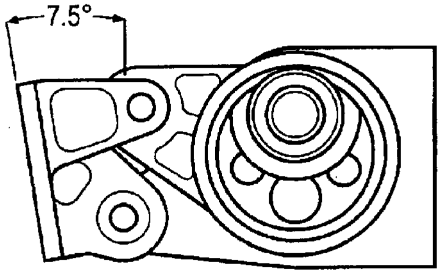
Figure 3B:
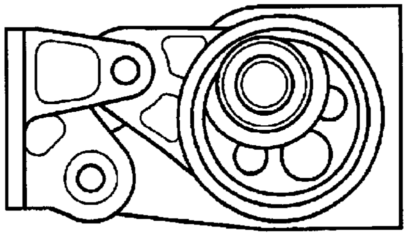
Figure 3A:
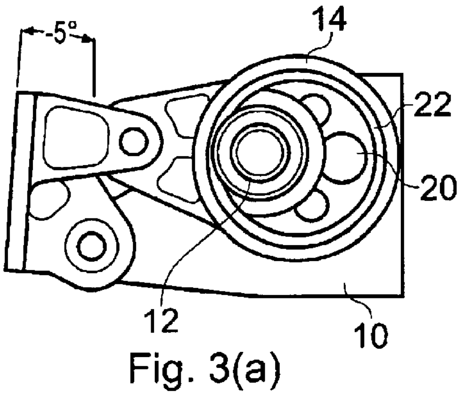

FIGS. 3*a* to 3*f* schematically illustrate the eccentric cam and lever assembly at each extent of a maximum permitted movement (FIGS. 3*a* and 3*f*) and at intermediate positions. Referring first to FIG. 3*a*, only one half of the bracket 10 is shown for clarity. The actual eccentric cam 20 is therefore clearly illustrated, together with its supporting bearing 12. Also visible is the bearing 22 that supports and guides the link element 14 around the periphery of the eccentric cam 20. In the particular embodiment shown in FIGS. 3*a* to 3*f* rotation of the eccentric cam through 180° causes the lever arm 3 to move through an arc of 35°, with one end of the permitted travel being arranged such that the lever arm 3 is at an angle of −5° to the vertical and being at an angle of +30° at the other extent of the travel (FIG. 3*f*).

Figure 4:
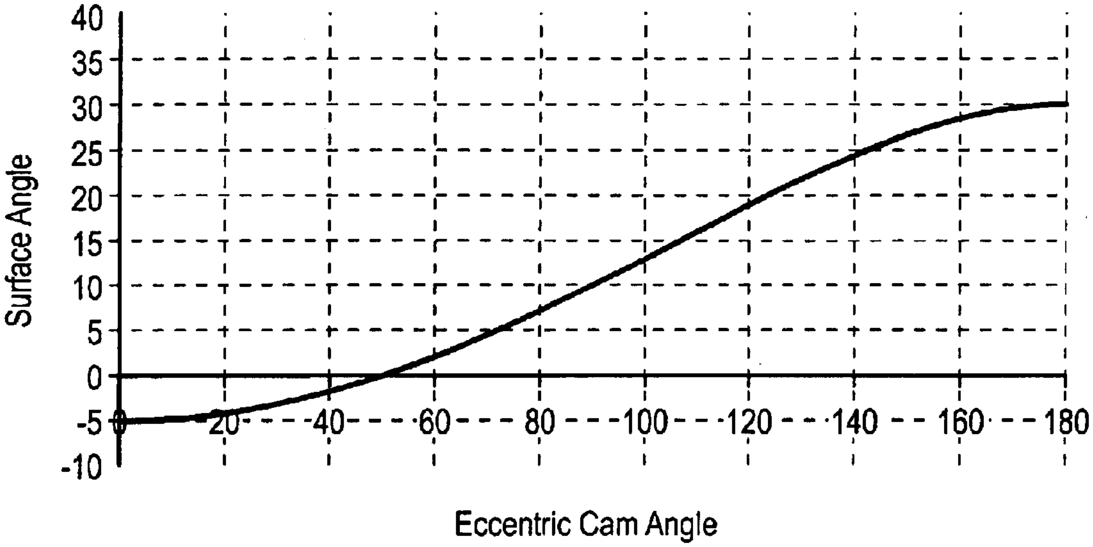
FIG. 4 is a graph illustrating the relationship between eccentric cam angle and surface angle of the lever assembly.

Using an eccentric cam through 180° of movement provides the system with particular advantageous geometrical features. As the movement of the cam approaches each of the extents of its travel, the mechanical advantage provided by the linkage increases to infinity as the moment arm of the driving cam 20 tends to zero (FIGS. 3*a* and 3*f*). At the positions it will be noted that a pivot point of the eccentric cam 20 and that of the lever arm 3 and link element 14 both coincide with a line of symmetry of the eccentric cam 20. At these two positions the lever arm 3 cannot exert any torque on the link element 14 and therefore the actuator will have no tendency to back drive due to any loads applied to the flight control surface to which it is attached. The cam mechanism is effectively latched at the two extents of its travel. However, close to the two extreme positions the mechanical advantage provided by the actuator is still relatively high. This is illustrated with respect to FIG. 4, which shows a plot of the cam angle against the surface angle of The lever arm 3. The shallower the gradient of the plotted line, the higher the mechanical advantage of the actuator linkage. It can therefore be seen from FIG. 4 that the plot line is effectively flat at 0 and 180° of cam angle, therefor providing effectively infinite mechanical advantage.

Figure 5:
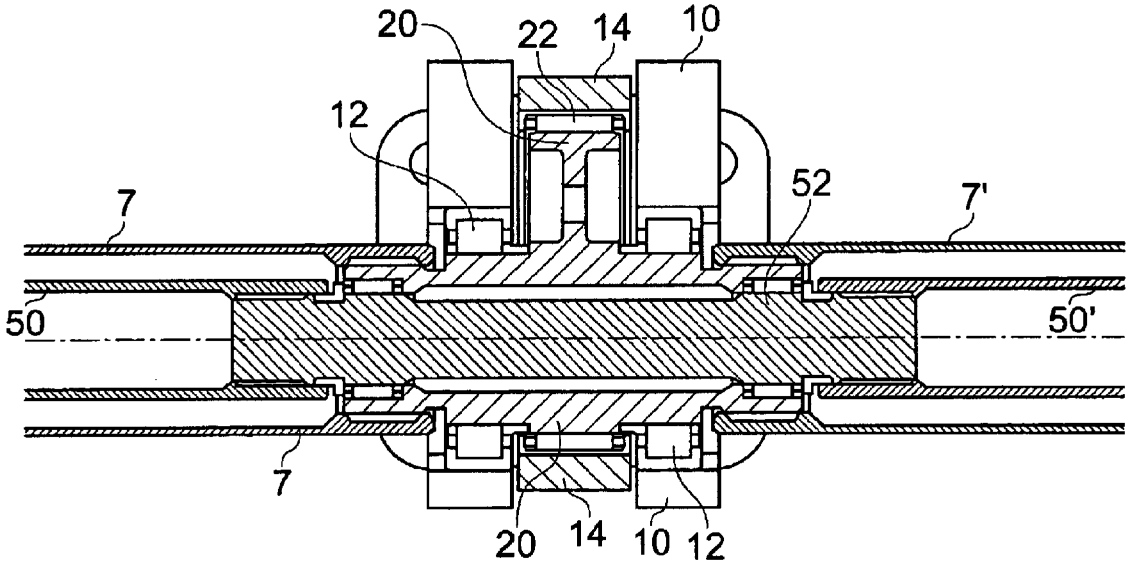
FIG. 5 is a cross-sectional diagram of an eccentric cam assembly according to an embodiment of the present invention.

A cross-sectional view of an eccentric cam mechanism and connecting torque tube is shown in FIG. 5. The bracket 10 is shown supporting the eccentric cam 20 view bearings 12. In turn, the link element 14 is supported on the eccentric cam 20 by bearings 22. It can be seen that the connecting torque tube 7 and 7' are hollow cylindrical tubes that are connected by a spline arrangement to the eccentric cam 20 itself. Also shown are further torque tubes 50 and 50' that are arranged concentrically within the outer torque tubes 7 and 7'. The further torque tubes 50 and 50' are connected via a similar spline arrangement to a through drive shaft 52 that is mounted on bearings within the eccentric cam 20. The function of the further torque tubes 50 and through drive shaft 52 will be described in more detail with reference to FIG. 6.

It will be appreciated by those skilled in the art that the axis of rotation of the torque tubes 7, 7' connecting each eccentric cam assembly 1 and the axis of rotation of each of the bearings within the eccentric cam assembly 1 that pivotally connecting the cam assembly 1 and lever arm 3 will be parallel to the longitudinal axis of the aircraft wing to which they are fitted. It will also be appreciated that some degree of flexing along the length of the aircraft wing occurs, both during flight and during take off and landing as the aerodynamic loads generated by the wing increase and decrease respectively. For larger civilian aircraft with correspondingly large wingspans the extent of permitted flexure of the wings is such that the wing tips may undergo a total deflection in the order of tens of centimeters. It is therefore necessary that the various bearings within the actuator assembly are of a kind that can accommodate some degree of misalignment and or translation along their rotational axis. Therefore, one or more of the bearings are preferably either rolling element bearings, plain bearings, spherical plain bearings or spherical rolling element bearings.

As mentioned with reference to FIG. 1, each actuator assembly comprises a gear arrangement 5 and a number of eccentric cam assemblies 1 and lever arms 3, with interconnecting torque tubes 7 and 7'. Although FIG. 1 illustrates four eccentric cam assemblies 1 and lever arms 3, it will be appreciated that any number of such assemblies may form a single actuator. The choice of the number of eccentric cam assemblies and lever arms may be made to optimise tho distribution of forces through both the aircraft flight control surface and the wing spar to which the assemblies 1 are connected.

The facility to increase or decrease the number of eccentric cam assemblies enables tailoring of the load distribution into the control surface and wing spar to meet structural limitations.

Figure 6:
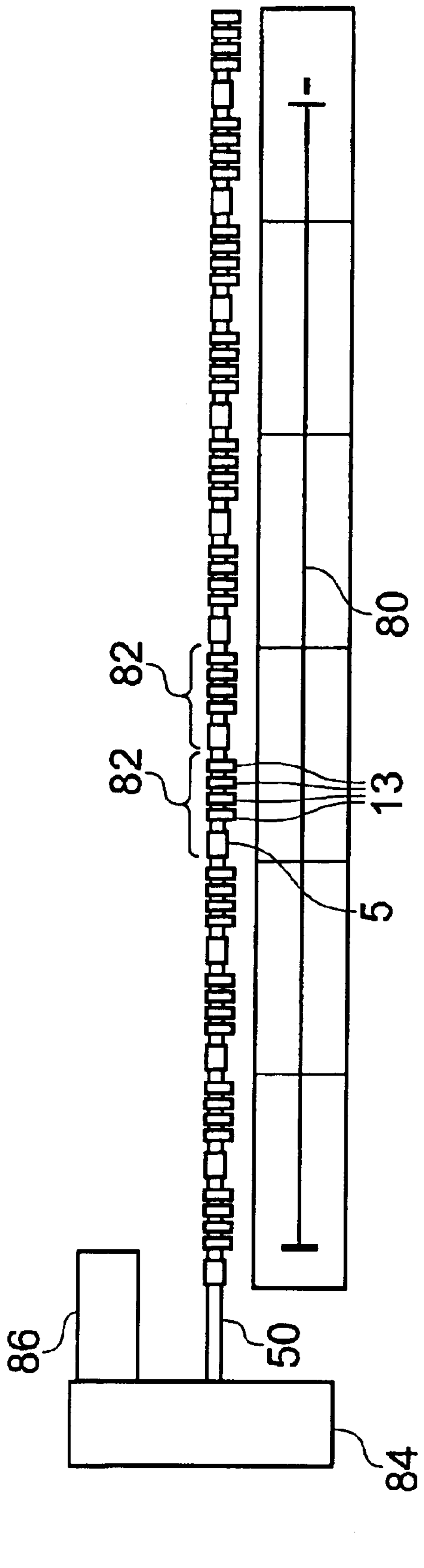
FIG. 6 is a schematic illustration of a flight surface actuator system according to an embodiment of the present invention.

It will be appreciated that ordinarily each wing will include more than a single flight control surface. Where this is the case, each flight control surface may be actuated by one or more individual actuators, each actuator being of the kind illustrated in FIG. 1. FIG. 6 illustrates an actuator system including a number of individual control surface actuators. In the illustrated embodiment, each individual flight control surface 80 is controlled by two individual actuators 82, each having a gear box 5 and four connected eccentric cam and lever arm assemblies 1, 3. Providing rotational drive to each of the gearboxes 5 is a power drive unit 84, which is in turn driven by a hydraulic motor 86. Rotational drive from the power drive unit 84 is output via torque tube 50. Referring to FIG. 5, the torque tube 50 is concentric and internal to the torque tubes 7 interconnecting the eccentric cam assemblies 1 of any particular actuator. Rotational drive from the power drive unit is therefore transmitted via the concentric torque tubes 50 and the through drive shaft 52 to each gearbox 5 of each actuator in an uninterrupted manner. Each gearbox 5 has its input connected to a torque tube 50 such that the rotational drive imparted from the power drive unit is transferred to the torque tube 7 of the respectively actuator assembly.

Embodiments of the present invention therefore provide an aircraft flight surface actuator and actuator system that typically has a lower weight compared to known actuator systems and also permits the flexible distribution of load into the flight control surface and static part of the aircraft to which the control surface is attached, the flexibility being achieved by altering the number and spacing of the eccentric cam mechanisms. Further advantage of the actuator according to embodiments of the present invention it that it exhibits a high overall mechanical efficiency that allows lower torques to be applied compared to other actuating systems, resulting in the use of smaller torque tubes and power drive units.

What is claimed is:

1. An aircraft flight surface actuator comprising:

at least one eccentric cam mechanism, the eccentric cam mechanism having an eccentric cam co-operating with a lever assembly, the lever assembly being arranged to be coupled to a flight surface, whereby rotation of the eccentric cam imparts movement of the flight surface; and a drive mechanism arranged to transmit a rotational driving force to the or each eccentric cam mechanism, the drive mechanism includes a gearbox arranged to receive a rotational driving force having a first speed and to convert the rotational driving force to a second speed prior to transmitting the driving force to the or each eccentric cam mechanism.

2. An aircraft flight surface actuator according to claim 9, wherein the lever assembly comprises a first lever element in engagement with the eccentric cam and a second lever element pivotally connected to the first element, the second element being arranged to be coupled to the flight surface.

3. An aircraft flight surface actuator according to claim 2, wherein the pivotal connection between the first and second lever elements is arranged to allow axial misalignment between the first and second lever elements to occur.

4. An aircraft flight surface actuator according to claim 2, wherein an engagement means is provided between the first lever element and the eccentric cam, the engagement means being arranged to allow axial misalignment between the first lever element and the eccentric cam.

5. An aircraft flight surface actuator according to claim 3, wherein the pivotal connection between the first and second lever elements comprises either a rolling element bearing, a plain bearing, a spherical plain bearing or a spherical rolling element bearing.

6. An aircraft flight surface actuator according to claim 2, wherein the eccentric cam is arranged to rotate through substantially 180°.

7. An aircraft flight surface actuator according to claim 2, wherein at either extent of rotation of the eccentric cam the pivot point between the first and second lever elements and the point of rotation of the eccentric cam coincide with a line of symmetry of the eccentric cam, wherein substantially zero torque can be transmitted from the first lever element to the eccentric cam.

8. An aircraft flight surface actuator according to claim 1, wherein said rotational driving forces are transmitted by means of at least one torque tube.

9. An aircraft flight surface actuator according to claim 1, comprising a plurality of eccentric cam mechanisms, wherein the rotational driving force is transmitted between successive eccentric cam mechanisms by means of at least one torque tube.

10. An aircraft flight surface actuator according to claim 4, wherein the engagement means comprises either a rolling element bearing, a plain bearing, a spherical plain bearing or a spherical rolling element bearing.

11. An aircraft flight surface actuator system comprising a plurality of aircraft flight surface actuators and a power drive unit arranged to impart a rotational driving force to each of the plurality of aircraft flight surface actuators, wherein each aircraft flight surface actuator comprises at least one eccentric cam mechanism, the eccentric cam mechanism having an eccentric cam co-operating with a lever assembly, the lever assembly being arranged to be coupled to a flight surface, whereby rotation of the eccentric cam imparts movement of the flight surface.

12. An aircraft flight surface actuator system according to claim 11, wherein the rotational driving force from the power drive unit is transmitted to each of the plurality of aircraft flight surface actuators by a plurality of torque tubes.

13. An aircraft flight surface actuator system according to claim 12, wherein each torque tube arranged to transmit the rotational driving force to each aircraft flight surface actuator is concentric with a respective torque tube arranged to transmit the rotational driving force between each eccentric cam mechanism.

* * * * *